United States Patent [19]

Gold et al.

[11] Patent Number: 4,768,683

[45] Date of Patent: Sep. 6, 1988

[54] FOOD FLOW CHANNELING INSERT FOR MANUALLY OPERATED FOOD DISPENSING MACHINE

[75] Inventors: Arthur Gold; John T. Magdars, both of Northbrook; Burton L. Siegal, Skokie, all of Ill.

[73] Assignee: Carousel Industries, Inc., Des Plaines, Ill.

[21] Appl. No.: 31,788

[22] Filed: Mar. 30, 1987

[51] Int. Cl.⁴ ............................................. G01F 11/10
[52] U.S. Cl. .................................. 222/328; 222/564; 222/368
[58] Field of Search ............... 222/368, 564, 547, 279, 222/288, 363, 362, 278, 154, 460, 328, 462; 221/266, 155

[56] References Cited

U.S. PATENT DOCUMENTS

| | | | |
|---|---|---|---|
| 768,412 | 8/1904 | Wagner | 221/266 |
| 924,252 | 6/1909 | Linde | 221/266 |
| 982,089 | 1/1911 | Patric | 222/368 |
| 1,168,859 | 1/1916 | Compton | 222/288 |
| 1,192,019 | 7/1916 | Taylor | 222/362 |
| 1,998,194 | 4/1935 | Hladky et al. | 222/362 |
| 2,670,105 | 2/1954 | Huhn | 222/564 |
| 2,684,143 | 7/1954 | Obodzinski | 221/266 |
| 2,778,527 | 1/1957 | Appel | 222/278 |

Primary Examiner—H. Grant Skaggs
Attorney, Agent, or Firm—Silverman, Cass, Singer & Winburn, Ltd.

[57] ABSTRACT

A granular food dispensing machine having a housing with a dispensing chamber, a metering dispensing unit and a discharge chute, a food supply reservoir designed to supply the dispensing chamber by gravity feed, and a dispenser chamber insert located in the dispensing chamber to facilitate and direct the flow of granular food from the reservoir through the metering dispensing unit and out the discharge chute by preventing the food from becoming trapped in the dispensing chamber.

7 Claims, 1 Drawing Sheet

U.S. Patent    Sep. 6, 1988    4,768,683
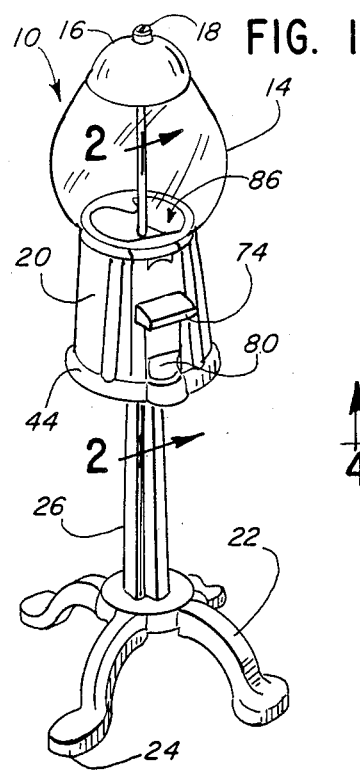
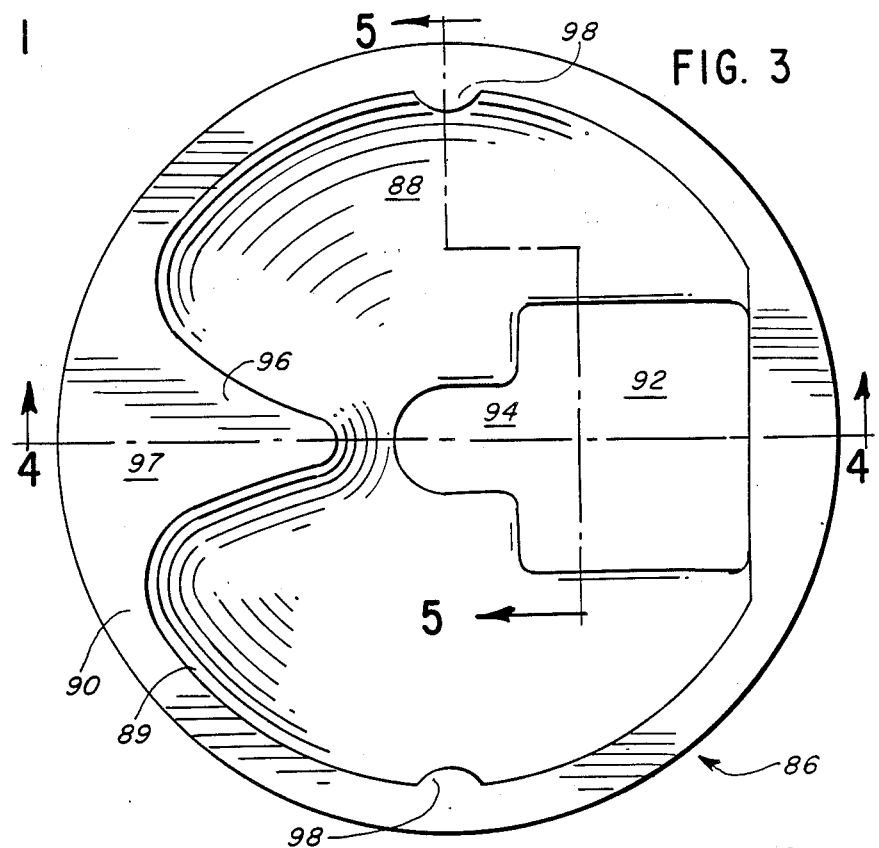
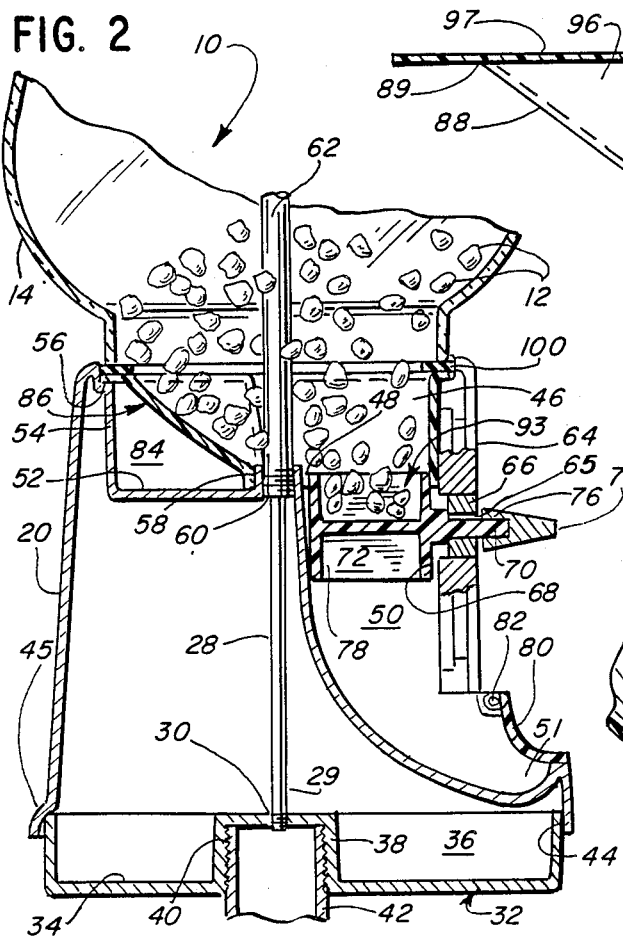
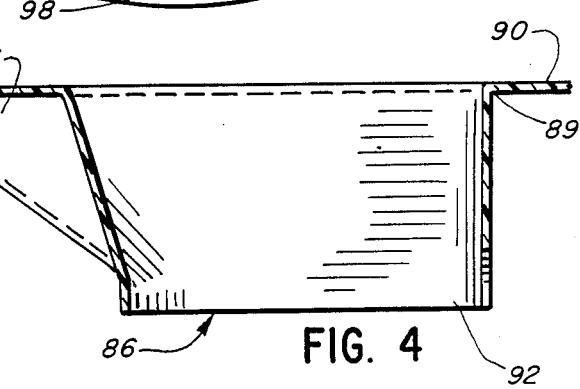
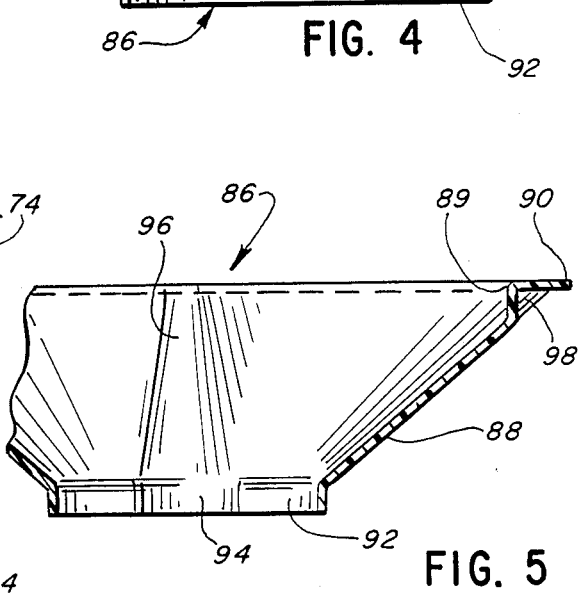

FOOD FLOW CHANNELING INSERT FOR MANUALLY OPERATED FOOD DISPENSING MACHINE

BACKGROUND OF THE INVENTION

This invention relates generally to manually operable vending machines for dispensing granular food products, such as, the familiar coin-operated gumball, candy or peanut vending machines. More particularly, the invention provides a machine with an improved food flow channeling insert communicating with the discharge chute for dispensing food in granular form from the machine.

Food vending machines of the coin-operated type generally include a food container globe of glass seated on a rigid base or housing in which the mechanism for dispensing the food product is installed. The housing is supported on a base plate which closes off the bottom open end of the housing. An elongated support rod or standard extends from the base plate through the housing, the dispensing mechanism, and the food container globe into engagement with a cap which can be tightened on the globe by means of a screw plug or other suitable fastener. Operably engaged with the internal dispensing mechanism is an external, manually operated actuator, such as a handle or lever, for actuating the internal mechanism to release the food product to be dispensed from the globe into an internal chute and out through a discharge opening in the housing.

Such a conventional vending machine may require insertion of a coin into a slot in the faceplate of the machine for engaging the external actuator with the internal dispensing mechanism so that food product can be dispensed. Non-coin-operated machines also are known. However, both in the case of a coin or a non-coin operated machine of this type, the supply of granular food is retained in the housing in a dispenser chamber which is opened into communication with the discharge chute by manipulating the external actuator. The chamber is formed by means of a substantially horizontal floor plate and an upstanding wall which is fixed to the housing. The floor plate has a suitable opening to allow the vertical support rod to pass through the center thereof.

The drawback of this construction is that the food product from the storage container fills the space of the dispenser chamber and packs down behind the vertical support rod remote from the entrance to the discharge chute. In a gravity-flow type of machine, the food so packed in the chamber behind the rod remains in place unless moved by canting the machine toward the entrance to the discharge chute.

Thus, there is a need for an improved dispenser chamber for a manually operated granular food dispensing machine which facilitates the flow of food from the machine in a consistent volume. Also, the undesirable accumulation of food in the chamber should be eliminated.

This invention provides a food flow channeling insert for a manually operated granular food dispensing machine which functions to facilitate movement of food from the dispensing chamber into the internal discharge chute connected to the discharge opening of the machine. The insert comprises a molded plastic member which can be easily and rapidly installed and removed from the machine housing for cleaning or replacement.

SUMMARY OF THE INVENTION

A food flow channeling insert is provided for a granular food dispensing machine having a housing with a dispensing chamber, a metering discharge unit, a vertical support rod and a discharge chute, and a food supply reservoir in communication with the dispensing chamber to supply granular food by gravity flow through the chamber, the metering discharge unit and out the discharge chute.

The insert is provided with features designed to prevent the retention of granular food within the dispensing chamber. As such, the insert includes a concave body with a peripheral retaining lip for supporting the body within the housing, a discharge aperture at the base of the body, and a flow-directing baffle. The insert is fabricated of low friction material to facilitate the flow of food from the dispensing chamber, and the flow-directing baffle prevents the accumulation of food behind the vertical support rod.

BRIEF DESCRIPTION OF THE DRAWINGS

FIG. 1 is a perspective view of a conventional food dispensing machine having the food flow channeling insert embodying the invention installed therein;

FIG. 2 is a fragmentary sectional view illustrating an embodiment of the invention taken through the machine along the line 2—2 of FIG. 1 and in the direction indicated generally;

FIG. 3 is a plan view illustrating the channeling insert of the invention;

FIG. 4 is a side elevational view of the invention taken along the line 4—4 of FIG. 3 and in the direction indicated generally; and FIG. 5 is an end view of the invention taken along line 5—5 of FIG. 3 and in the direction indicated generally.

DESCRIPTION OF THE PREFERRED EMBODIMENTS

Referring to FIG. 1, a conventional food dispensing machine having the food flow channeling insert embodying the invention installed therein is designated generally by the reference numeral 10. Granular food particles 12 seen in FIG. 2 are stored in a globe-shaped food storage reservoir or container 14. The reservoir or container 14 can be fabricated of any suitable material such as glass or synthetic plastic and its shape also may vary from that illustrated. To replenish the supply of food 12 in the container 14, the cap 16 can be removed by withdrawing a screw plug 18 to expose a refill port (not shown) which is provided by the open upper end of globe 14.

The storage container 14 rests on a housing 20. The housing 20 need not have a specific shape or be made of a specific material. However a heavy material, such as cast iron has been preferred to assure strength and long life for the machine. For illustrative purposes only, machine 10 has a plurality of legs 22, feet 24 and a pedestal 26 for elevating the machine to a convenient height for using it. The legs 22, the feet 24 and the pedestal 26 are not restricted to a specific shape or material and can, in fact, be eliminated altogether to enable supporting the machine on a horizontal surface without departing from the present invention.

Referring now to FIG. 2, which depicts machine 10 in greater detail an elongated support rod 28 extends vertically from the housing 20 through the food storage container 14 and is engaged with the screw plug 18 to assemble the food dispensing machine 10 into a single unit. The lower end 29 of the rod 28 is threaded into a threaded aperture 30 of a central boss 38 formed in a base plate 32. The base plate 32 includes a floor 34, a vertically projecting annular wall 36 and the central boss 38. The central boss 38 also is provided with a threaded interior annular wall 40 which can receive the threaded upper end 42 of the pedestal 26, where the pedestal 26 is employed in the machine 10.

The housing 20 is open at its bottom end 44 which is provided with a slightly flared lip 45 which seats upon the annular wall 36 of the base plate 32. In addition, the housing 20 is provided with a dispensing chamber 46 integral therewith having a discharge aperture or entrance 48 communicating with a discharge chute 50 having an outlet 51. The purpose of the dispensing chamber 46 is to receive the food 12 from the container 14 and pass it to the dispensing apparatus hereinafter described and then on through the discharge chute 50. The dispensing chamber 46 is provided with a floor 52, an annular upstanding wall 54, an annular shoulder 56 at the upper end of the annular wall 54 and a central boss 58 which is threaded to receive a threaded end 60 of a cylindrical threaded cover sleeve 62. The cover sleeve 62 is constructed and arranged to slide over the vertical support shaft 28 and cooperates with the cap 16 and the screw plug 18 to secure the storage container 14 to the housing 20.

The housing 20 has a faceplate 64 having a central bore 65 with a hub 66. A dispenser spindle 68 with an axial stub shaft 70 and a plurality of compartments 72 is located in the discharge chute 50 such that the stub shaft 70 may be journalled for axial rotation in the hub 66. The spindle 68 is dimensioned to be coextensive with the discharge aperture 48 so that the food 12 may not bypass it and flow uncontrolled down the discharge chute 50.

A control handle or actuator 74 is provided with a recess 76 which preferably frictionally engages or is otherwise secured to the stub shaft 70. The control handle 74 may also be provided with suitable adhesive or other conventional fastener to secure it to stub shaft 70. In the preferred embodiment, the dispenser spindle 68 is fabricated of rigid polymeric material, while the control handle 74 is fabricated of metallic material, such as cast aluminum, but, in the alternative, any suitably rigid material may be used.

The compartments 72 of dispenser spindle 68 are designed so that a metered supply of the food 12 may be contained therein. In the preferred embodiment, spindle 68 is provided with four such compartments, each separated by the divider 78. The compartments may be referred to as upper or food-filled compartments in communication with the food particles stored in chamber 46, and lower or empty compartments which have discharged their food 12 into chute 50. As the spindle 68 rotates, each compartment 72 changes its designation from an upper compartment to a lower compartment. As long as the control handle 74 is stationary, the food 12 cannot flow through the discharge chute 50. As the control handle 74 is manually rotated, the spindle 68 rotates in hub 66, causing the food 12 to be released from one of the upper compartments 72. The number of compartments 72 which discharge the food 12 into the chute 50 is determined by the distance the handle 74 is rotated.

Access to the food 12 at the outlet 51 of the chute 50 is obtained by lifting flap 80 which is pivotable on a shaft 82 secured to the housing 20.

A significant drawback of conventional granular food dispenser machines is that the shape of the dispenser chamber 46 causes the food 12 to accumulate in an area 84 contiguous the support rod sleeve 62 until the collected material forms an incline which directs subsequently introduced food 12 into the discharge aperture 48. Unfortunately, the food trapped in this residue area 84 must be manually removed or displaced from the dispenser chamber 46 to prevent spoilage.

Another impediment to the free flow of food 12 through the dispenser chamber 46 and out the discharge chute 50 is the cover sleeve 62 which projects vertically through the dispensing chamber 46 and is located in close proximity to discharge aperture 48. The food 12 tends to accumulate behind the cover sleeve 62 because of its central location in the dispenser chamber 46 and close proximity to the discharge aperture 48.

To alleviate this unwanted accumulation of food and the impediments to free flow through dispenser chamber 46, the invention herein provides a food flow channeling insert 86 which is depicted in more detail in FIGS. 3-5.

The insert 86 is comprised of a generally circular, concave or bowl-shaped body 88 coextensive in dimension to that of the dispenser chamber 46. The insert has a peripheral rim 89, a peripheral lip 90 extending horizontally outwardly from the rim, and a discharge aperture 92 which is coextensive with and in communication with entrance 48 to the discharge chute 50. In addition, a second aperture 94 is provided for the cover sleeve 62 to pass therethrough. In the preferred embodiment, the cover sleeve aperture 94 is in communication with the discharge aperture 92, but this need not be the case.

To assist in the direction of the food 12 around the cover sleeve 62, the insert 86 is provided with a flow directing baffle 96. Baffle 96 is an integral portion of the body 88 and projects in tapered fashion from the peripheral lip 90 towards the center of the body 20, the usual location of the cover sleeve 62, on a line which intersects discharge aperture 92. The baffle 96 is also provided with a closed top 97 which is an integral part of the peripheral lip 90 to prevent the food 12 from being trapped therein.

In a broader sense, the insert 86 provides means for preventing the unwanted accumulation of food particles or impediment to particle flow by blocking food from entering the undesirable areas of the dispenser chamber 46 identified above. Accordingly, the concave shape of the body 88 essentially closes off the area 84, and the flow directing baffle 96 with its closed top 97 prevents any accumulation behind the cover sleeve 62 and directs the food 12 to either side of it.

The insert 86 is fabricated of thermoplastic or thermosetting polymeric resin, with all of the above identified physical features integrally molded or otherwise formed therein. Any polymeric material having suitable rigidity, light weight and low coefficient of friction can be used to fabricate the dispenser chamber insert 86.

The insert 86 is seated in the dispenser chamber 46 with the peripheral lip 90 resting upon the annular shoulder 56. The position of the insert 86 within the chamber 46 is maintained by a plurality of molded tabs 98 which engage lugs in chamber 46 (not shown). A polymeric gasket 100 is placed on top of the peripheral lip 90, and receives the base of the food storage container 14.

In operation, the food 12 stored in the container 14 flows via gravity into the dispenser chamber 46. The insert 86 directs the food 12 around the support sleeve 62, away from area 84 and toward the discharge aperture 48. Measured amounts of food are stored in the uppermost compartments 72 of the dispenser spindle 68, and no food passes into the discharge chute 50 as long as the spindle 68 is stationary. Once the control handle 74 is turned, the compartments 72 sequentially discharge their contents into chute 50. The farther the handle 74 is turned, the more compartments 72 are emptied and the more food 12 is discharged. The consumer obtains the food 12 from the outlet 51 of the discharge chute 50 by lifting the flap 80.

Many modifications and variations of the present invention are possible in light of the above teachings. It is therefore, to be understood that within the scope of the appended claims, the invention may be practiced otherwise than as specifically described.

What is claimed and desired to be secured by Letters Patent of the United States is:

1. A food flow channeling insert for installation in a gravity-flow granular food dispensing machine having a food supply reservoir and a housing having an open top end having said reservoir supported thereon in communication with the housing through said top end, said housing having a discharge chute to ambient atmosphere remote from said top end and a vertical support rod extending through said housing and reservoir for retaining the machine in operable assembly, said insert adapted to be installed in said housing for optimizing granular food flow from said reservoir through said housing to the discharge chute around the support rod comprising:
   (a) a unitary body having a bottom end and an open upper end;
   (b) a retaining means projecting outwardly around a perimetric edge of the open upper end for supporting the insert in the housing, and a discharge aperture in said bottom end located to communicate with the discharge chute of the housing; and
   (c) a baffle extending inwardly from said perimetric edge and extending from said open upper end and tapered toward said discharge aperture and said rod, said unitary body having an upper surface presenting on the sides of the baffle a pair of concave surfaces for directing granular food flow in opposite directions over said surface from said upper end to said discharge aperture and around the support rod into said discharge chute in the housing whereby to prevent food accumulation behind said rod.

2. The insert defined in claim 1 including means for permitting passage of said support rod therethrough.

3. In a manually-operable granular food dispensing machine having a base housing opening at its top end, a discharge chute to ambient atmosphere, a dispensing chamber within the housing communicating with said chute, food dispenser means installed in the housing for dispensing food portions through the chute, external actuator means coupled to said dispenser means for controlling discharge of a metered quantity of food through said chute, a food storage reservoir seated on the housing in communication with the dispensing chamber through said open top end, and a support rod extending thorugh the base and reservoir for retaining the same in operable assembly, the improvement comprising:
   (a) a food flow channeling insert supported in said dispensing chamber including a unitary bowl-shaped body open at its upper end and a discharge opening in its opposite bottom end communicating with said discharge chute;
   (b) a peripheral flange projecting outwardly from around said upper end and supported on the perimetric edges of said top end;
   (c) said insert having an inwardly projecting, double tapered concave formation extending from said upper end toward said bottom end and around said discharge chute and providing a pair of surfaces for directing granular food thereon in opposite directions toward and through the discharage chute and around the support rod in the dispensing chamber.

4. The food dispenser machine defined in claim 3 wherein said insert is removable therefrom.

5. The food dispenser machine defined in claim 3 wherein said insert is fabricated of a low-friction polymeric material.

6. The food dispenser machine defined in claim 3 wherein said insert is integrally formed.

7. The food dispenser machine defined in claim 3 wherein said insert is made of a low-friction polymeric material.

* * * * *